United States Patent [19]

Itoh et al.

[11] Patent Number: 5,350,537
[45] Date of Patent: Sep. 27, 1994

[54] LIQUID CRYSTAL DISPLAY DEVICE

[75] Inventors: Nobuyuki Itoh, Tenri; Tsugiko Taniguchi, Kitakatsuragi, both of Japan

[73] Assignee: Sharp Kabushiki Kaisha, Osaka, Japan

[21] Appl. No.: 927,606

[22] Filed: Aug. 10, 1992

Related U.S. Application Data

[63] Continuation of Ser. No. 581,293, Sep. 12, 1990, abandoned.

[30] Foreign Application Priority Data

Sep. 14, 1989 [JP] Japan .................... 1-239590
Mar. 27, 1990 [JP] Japan .................... 2-80083

[51] Int. Cl.$^5$ .................. C09K 19/52; C09K 19/56; G02F 1/13
[52] U.S. Cl. ................. 252/299.01; 252/299.4; 359/103
[58] Field of Search ............. 252/299.01, , 299.4; 359/103

[56] References Cited

U.S. PATENT DOCUMENTS

| | | | |
|---|---|---|---|
| 3,932,298 | 1/1976 | Labes | 252/299.01 |
| 4,243,601 | 1/1981 | Yoshida et al. | 552/304 X |
| 4,250,063 | 2/1981 | Kotani et al. | 526/113 X |
| 4,535,042 | 8/1985 | Kitayama et al. | 430/56 |
| 4,657,694 | 4/1987 | Heeger et al. | 252/299.01 |
| 4,769,448 | 9/1988 | Heeger et al. | 534/804 |
| 4,803,011 | 2/1989 | Barraud et al. | 252/500 |
| 4,867,538 | 9/1989 | Yoon et al. | 359/103 X |
| 4,879,059 | 11/1989 | Hanyu et al. | 252/299.4 |
| 4,907,859 | 3/1990 | Takada et al. | 359/86 X |

FOREIGN PATENT DOCUMENTS

| | | |
|---|---|---|
| 0365255 | 4/1990 | European Pat. Off. . |
| 0139578 | 10/1981 | Japan . |
| 0139579 | 10/1981 | Japan . |
| 3048388 | 3/1988 | Japan . |
| 1062386 | 3/1989 | Japan . |
| 86/201028 | 2/1986 | World Int. Prop. O. . |

*Primary Examiner*—Robert L. Stoll
*Assistant Examiner*—C. Harris
*Attorney, Agent, or Firm*—David G. Conlin; Linda M. Buckley

[57] ABSTRACT

A liquid crystal display device comprising a pair of substrates each having transparent electrodes over the surface thereof and an orientation film over the electrode, and a liquid crystal interposed between the pair of substrates, the liquid crystal being a ferroelectric liquid crystal composition having incorporated therein a conjugated cyano compound or conjugated halogen compound serving as an electron acceptor.

2 Claims, 3 Drawing Sheets

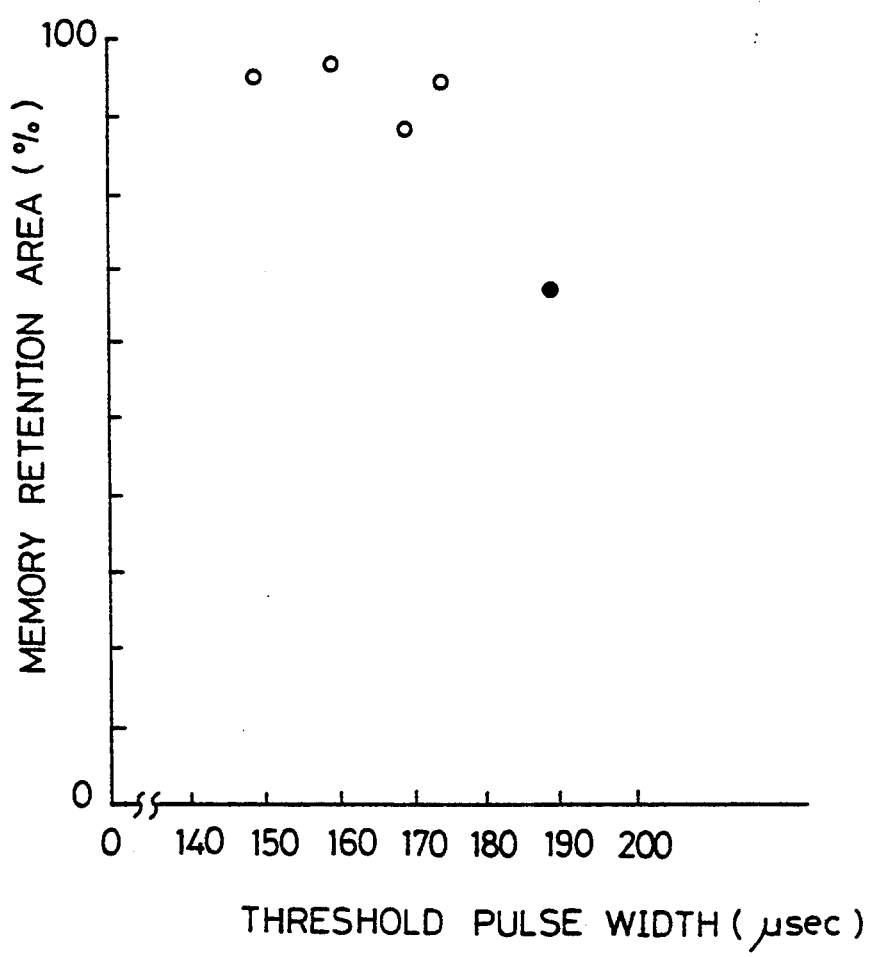

LIQUID CRYSTAL DISPLAY DEVICE

"This is a continuation of copending application(s) Ser. No. 07/581,293 filed on Sep. 12, 1990," now abandoned.

BACKGROUND OF THE INVENTION

1. Field of the Invention

The present invention relates to liquid crystal display devices wherein a ferroelectric liquid crystal is used.

2. Description of the Prior Art

Liquid crystals include those of chiral smectic C phase (hereinafter referred to simply as "SmC* liquid crystals") having a helical structure and exhibiting ferroelectric properties.

When such a SmC* liquid crystal is injected into a cell having a small gap, the helical structure of the SmC* liquid crystal is unwound under the influence of the interface, resulting in the conjoint presence of a domain wherein the liquid crystal molecules are stabilized as inclined at a tilt angle $\theta$ with respect to a normal of the smectic layer, and a domain wherein the liquid crystal molecules are stabilized as tilted at $-\theta$ in the opposite direction. When a voltage is applied to the SmC* liquid crystal within the cell, the liquid crystal molecules and the spontaneous polarization thereof can be oriented uniformly in a direction. When the polarity of the voltage to be applied is changed, the orientation of the liquid crystal molecules can be changed from a definite state to another state for switching drive. Switching drive causes the SmC* liquid crystals within the cell to produce altered birefringent light, so that the transmitted light is controllable by interposing the cell between two polarizers. Furthermore, when the application of voltage is discontinued, the orientation of the liquid crystal molecules is maintained in the state before the discontinuation by the ability of the interface to regulate the orientation. Thus, a memory effect is also available.

Accordingly, it has been attempted to utilize the memory effect of SmC* liquid crystals for providing high-duty liquid crystal display devices resorting to a multiplex drive system.

Such a liquid crystal display device comprises two glass substrates opposed to each other in parallel, and a plurality of transparent electrodes arranged in the form of parallel stripes and formed on each of the opposed surfaces of the substrates. The transparent electrodes on one of the glass substrates are arranged perpendicular to those of the other glass substrate. The electrode bearing surface of each substrate is further formed with an orientation film with an insulation film interposed therebetween. A layer of SmC* liquid crystals is provided between the two glass substrates.

The liquid crystal device has the following problem. The uneven presence of charges resulting from the spontaneous polarization of liquid crystal molecules produces an electric field (polarization electric field) within the device, impairing the memory effect in memory states, i.e., in a state wherein the orientation angle of the molecules is $+\theta$, and in a state wherein the angle is $-\theta$ (i.e., the memory effect in a bistable state).

Stated more specifically, a polarization electric field due to uneven presence of polarized charges of liquid crystal molecules is present within the cell even in the memory state as shown in FIG. 2 (a). Accordingly, in response to the polarization electric field, the liquid crystal molecules are altered in orientation so as to minimize the energy within the cell as seen in FIG. 2 (b). Presumably for this reason, it becomes impossible to assume a bistable memory state. Indicated at 6 in FIG. 2 is the C-director of liquid crystal molecules, and at 7 the spontaneous polarization of liquid crystal molecules. The tip of this arrow represents +pole, and the other end of the arrow represents - pole. Represented by 8 and 9 are positive and negative polarized charges, respectively, as unevenly present. Indicated at 10 is the presence of the polarization electric field in the direction of the arrow.

Accordingly, an object of the present invention is to provide a liquid crystal display device having a bistable memory effect prevented from impairment due to a polarization electric field.

SUMMARY OF THE INVENTION

The present invention provides a liquid crystal display device comprising a pair of substrates each having transparent electrodes over the surface thereof and an orientation film over the electrode, and a liquid crystal interposed between the pair of substrates, the liquid crystal being a ferroelectric liquid crystal composition having incorporated therein a conjugated cyano compound or conjugated halogen compound serving as an electron acceptor.

BRIEF DESCRIPTION OF THE DRAWINGS

FIG. 3 is a diagram showing the conditions for switching the devices of Examples 1 to 4 of the invention and a comparative device with dipolar pulses of $\pm 10$ V, and variations in the area of retention of the memory state determined for the devices.

DESCRIPTION OF THE PREFERRED EMBODIMENTS

Figure 1:
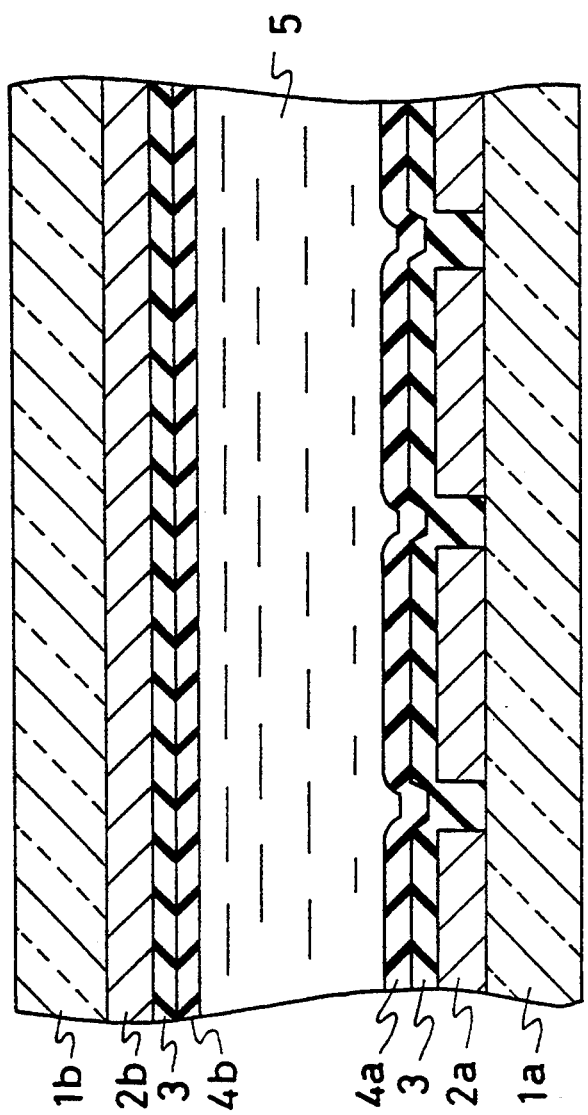
FIG. 1 is a diagram of a liquid crystal display device embodying the invention.
Figure 2B:
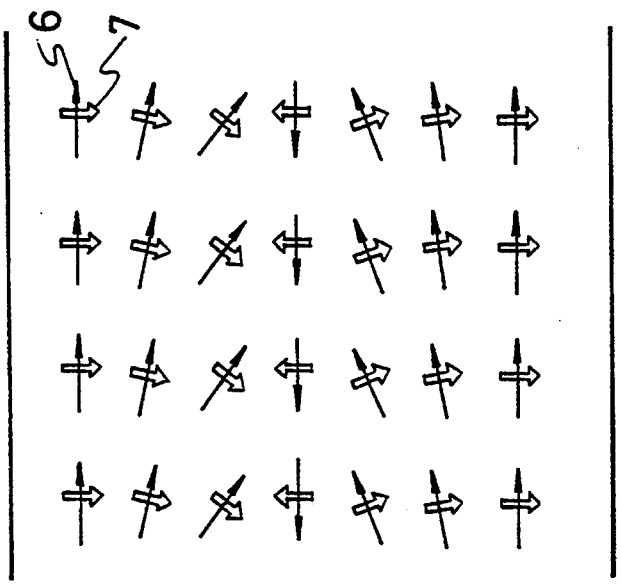
FIGS. 2a-b is a diagram illustrating the instability of memory of a ferroelectric liquid crystal device due to a polarization electric field.
Figure 2A:
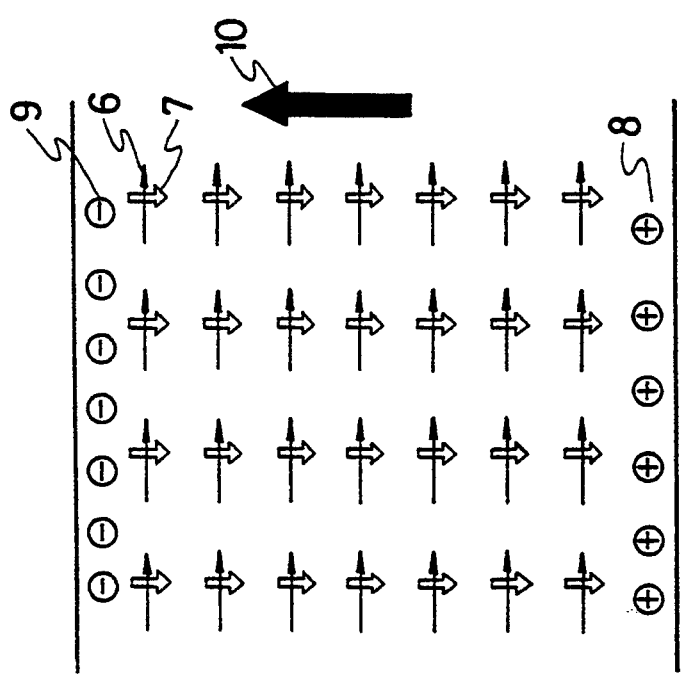

According to the present invention, a ferroelectric liquid crystal composition is used which has incorporated therein a conjugated cyano compound or conjugated halogen compound serving as an electron acceptor.

The ferroelectric liquid crystals for use in the composition are responsive to the application of voltage at a high speed to exhibit a specified orientation for transmitting or blocking light for the display device. Useful ferroelectric liquid crystals are those which have a chiral center, are not racemates and possess permanent dipole moment perpendicular to the long axes of molecules and hence exhibit Sc* phase. Examples of such liquid crystals are (S)-4'-n-octyloxy-biphenyl -4-carboxylic acid-1-trifluoromethyl-heptyl ester, (s)-4'-n-octyloxy-biphenyl-4-carboxylic acid-1-trifluoromethyl-3-phenyl-(tranc)-2-propenyl ester,

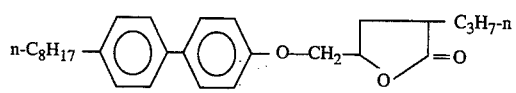

DOBAMBC (p-decyloxybenzylidene-p'-amino-2 -methlbutyl-cinnamic acid ester ), MORA-8 (S-4-(6- methyl ) octyl-resorcylidene-4'-octylaniline, DOBA-1-MBC (p-decyloxy-benzylidene-p'-amino-1-methyl-butylicinnamic acid ester),

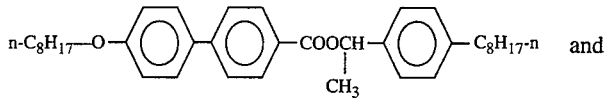 and

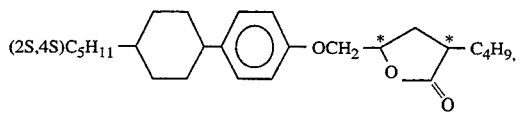

or an appropriate mixture thereof.

Usually, the liquid crystals are used as admixed with other substances to adjust the temperature range wherein the liquid crystals exhibit Sc* phase. Commercially available ferroelectric liquid crystals which are adapted to exhibit Sc* phase at room temperature are CS-1014, CS-1013, CS-1017 (which are products of Chisso Corporation), and ZLI4237/000 (product of Merck & Co., Inc.)

The conjugated cyano compound or conjugated halogen compound serving as an electron acceptor acts to give a bistable memory effect to the ferroelectric liquid crystal or composition thereof. Usable as such compounds are those capable of attenuating or neutralizing the polarization electric field produced within the device by uneven presence of polarized charges due to the spontaneous polarization of the ferroelectric liquid crystal molecules. The conjugated cyano compound is one having cyano groups and a carbon-carbon double bond which can be conjugated with the triple bond of the cyano groups. Preferable as such compounds are dichlorodicyanoparabenzoquinone (DDQ), tetracyanoquinodimethane (TCNQ), tetracyanoethylene (TCE), tetrafluorotetracyanoquinodimethane (TFTCNQ) and tetracyanobenzene (TCNB) since these compounds act on liquid crystals up to 20 (nc/cm$^2$) in spontaneous polarization so as to cause the liquid crystal to exhibit a remarkable bistable memory effect. Examples of useful conjugated halogen compounds are dichlorodifluoroquinone, dichloroanthraquinone, tetrachlorodiphenoquinone (TCDQ), tetrabromodiphenoquinone (TBDQ) and the like.

The conjugated cyano compound or conjugated halogen compound serving as an electron acceptor can be used usually in an amount of 100 to 5000 ppm based on the ferroelectric liquid crystal composition. Preferably, the amount is 100 to 500 ppm since a satisfactory bistable memory effect and uniform display characteristics can then be obtained even if the substrates are not smaller than 7.5 cm square. When the amount is in excess of 500 ppm, a satisfactory memory effect and uniform display characteristics are still available if the substrates are small, whereas in the case where the substrates are not smaller than 7.5 cm square, a chromatographic effect produces variations in the color of display in the direction away from the injecting opening or irregularities in characteristics such as switching behavior to impair the uniformity of the display. The excessive amount is therefore undesirable.

Stated specifically, the liquid crystal display device of the present invention can be prepared by selectively forming transparent electrodes on the surface of each of a pair of substrates, further forming an orientation film over the electrodes on each substrate, arranging the pair of substrates usually at a spacing of 1 to 4 μm with their orientation films opposed to each other, and subsequently injecting into the space between the substrates a ferroelectric liquid crystal composition incorporating therein a specified quantity of the conjugated cyano compound or conjugated halogen compound serving as an electron acceptor. The ferroelectric liquid crystal layer is driven by applying a voltage selectively across the transparent electrodes for use in displaying desired characters, images or the like.

The conjugated cyano compound or conjugated halogen compound serving as an electron acceptor and added to the ferroecletric liquid crystal attenuates or neutralizes the polarization electric field produced within the device by uneven presence of polarized charges due to the spontaneous polarization of the liquid crystal molecules.

The present invention will be described below in greater detail with reference to the illustrated embodiment.

EXAMPLE 1

As shown in FIG. 1, transparent electrodes 2a, 2b were formed on glass substrates 1a, 1b, and the electrodes were coated with OCD TYPE-II, product of Tokyo Oyokagaku Co., Ltd., using a spinner, followed by baking to form insulation film 3 of SiO$_2$. Next, 1% m-cresol solution of nylon 6 (product of Toray Industries, Ltd.) was coated on the insulating film using a spinner, and the coating was baked and rubbed to form orientation film 4a, 4b. The two substrates thus prepared were spaced apart by 2.0 μm as opposed to each other to form a cell. A ferroelectric liquid crystal (CS-1014, product of Chisso Corporation, 5.4 nC/cm$^2$ in spontaneous polarization) containing 350 ppm of dichlorodicyanoparabenzoquinone (DDQ) added thereto was injected into the cell to obtain an assembly.

The assembly was interposed between two polarizers to prepare a liquid crystal display device, which was small in threshold pulse width (150 μsec), exhibited a high value (95%) in memory retention area as seen in FIG. 3, and was found to exhibit satisfactory bistable memory at the pixel portions of the electrode matrix.

EXAMPLE 2

Six liquid crystal display devices were prepared in the same manner as in Example 1 except that the amount of DDQ, which was 350 ppm in Example 1, was changed to 100, 200, 500, 1000, 2000 or 5000 ppm.

Consequently, the devices exhibited satisfactory bistable memory at the pixel portions of the electrode matrix. Of these devices, those prepared with use of 200 ppm or 500 ppm of DDQ were found more satisfactory in bistable memory.

EXAMPLE 3

Eight liquid crystal display device were prepared in the same manner as in Example 1 with the exception of using, instead of DDQ used in Example 1, tetracyanoquinodimethane (TCNQ), tetracyanoethylene (TCE), tetrafluorotetracyanoquinodimethane (TFTCNQ), tetracyanobenzene (TCNB), dichlorodifluoroquinone, dichloroanthraquinone, tetrachlorodiphenoquinone (TCDQ) or tetrabromodiphenoquinone (TBDQ).

These devices exhibited satisfactory bistable memory.

EXAMPLE 4

Two liquid crystal display devices were prepared in the same manner as in Example 1 with the exception of using CS-1013 (product of Chisso Corporation, 16 nC/cm$^2$ in spontaneous polarization) or CS-1017 (product of Chisso Corporation, 7.1 nC/cm$^2$ in spontaneous polarization) as a liquid crystal in place of CS-1014 (product of Chisso Corporation).

The devices exhibited satisfactory bistable memory.

Comparative Example 1

A liquid crystal display device was prepared in the same manner as in Example 1 with the exception of using a ferroelectric liquid crystal free from DDQ in place of the liquid crystal incorporating DDQ and used in Example 1.

The device was great in threshold pulse width (190 $\mu$sec) and small in memory retention area (65%) as seen in FIG. 3.

EXAMPLE 5

A device equivalent to the one shown in FIG. 1 was prepared. Each of two substrates was coated with SiO$_2$ (OCD TYPE-II, product of Tokyo Oyokagaku Co., Ltd.) by a spinner, followed by baking to prepare an insulation film, which was then coated with PSI-XSO12 by a spinner, followed by baking to form an orientation film. The two substrates thus prepared were rubbed and then spaced apart by 2.0 $\mu$m to obtain a cell. A liquid crystal (ZLI4237/000, product of Merck & Co., Inc.) containing 200 ppm of tetrafluorotetracyanoquinodimethane (TFTCNQ) added thereto was injected into the cell.

The cell was observed as interposed between two polarizers to find that even if the substrates were larger than 7.5 cm square, the pixel portions of the electrode matrix exhibited satisfactory bistable memory and uniform display characteristics.

EXAMPLE 6

Eight liquid crystal display devices were prepared in the same manner as in Example 5 with the exception of using dichlorodicyanoparabenzoquinone (DDQ), tetracyanoquinodimethane (TCNQ), tetracyanoethylene (TCE), tetracyanobenzene (TCNB), dichlorodifluoroquinone, dichloroanthraquinone, tetrachlorodiphenoquinone (TCDQ) or tetrabromodiphenoquinone (TBDQ) in place of tetrafluorotetracyanoquinodimethane (TFTCNQ) used in Example 5. Like the device of Example 5, these devices exhibited satisfactory bistable memory and uniform display characteristics.

EXAMPLE 7

Eighteen liquid crystal display devices were prepared in the same manner as in Example 5 with the exception of using 100 ppm or 500 ppm of dichlorodicyanoparabenzoquinone (DDQ), tetracyanoquinodimethane (TCNQ), tetracyanoethylene (TCE), tetrafluorotetracyanoquinodimethane (TFTCNQ), tetracyanobenzene (TCNB), dichlorodifluoroquinone, dichloroanthraquinone, tetrachlorodiphenoquinone (TCDQ) or tetrabromodiphenoquinone (TBDQ) in place of 200 ppm of tetrafluorotetracyanoquinodimethane (TFTCNQ). Like the device of Example 5, these devices exhibited satisfactory bistable memory and uniform display characteristics.

EXAMPLE 8

Nine kinds of display devices were prepared in the same manner as in Example 5 except that the ferroelectric liquid crystal used had admixed therewith 1000 ppm of dichlorodicyanoparabenzoquinone (DDQ), tetracyanoquinodimethane (TCNQ), tetracyanoethylene (TCE), tetrafluorotetracyanoquinodimethane (TFTCNQ), tetracyanobenzene (TCNB), dichlorodifluoroquinone, dichloroanthraquinone, tetrachlorodiphenoquinone (TCDQ) or tetrabromodiphenoquinone (TBDQ) in place of 200 ppm of tetrafluorotetracyanoquinodimethane (TFTCNQ). When the substrates used were up to 4.5 cm square in size, these liquid crystal display devices exhibited satisfactory bistable memory and uniform display characteristics. However, when the substrates were larger than 4.5 cm square, the display surface locally exhibited a difference in color in the vicinity of the injection opening, and the switching and like characteristics involved irregularities in a direction away from the injection opening.

EXAMPLE 9

A liquid crystal display device was prepared in the same manner as in Example 1 except that the ferroelectric liquid crystal substance, CS-1014, used in Example 1 was replaced by the composition listed in Table 1 and having incorporated therein 2% of the compound represented by:

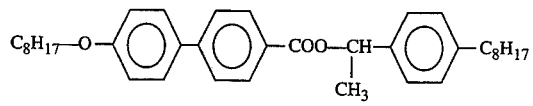

TABLE 1

| compound | wt. % |
| --- | --- |
| C$_7$H$_{15}$–⟨N=N⟩–⟨○⟩– OC$_7$H$_{15}$ | 10 |
| C$_7$H$_{15}$–⟨N=N⟩–⟨○⟩– OC$_8$H$_{17}$ | 5 |
| C$_7$H$_{15}$–⟨N=N⟩–⟨○⟩– OC$_9$H$_{19}$ | 15 |
| C$_8$H$_{17}$–⟨N=N⟩–⟨○⟩– OC$_8$H$_{17}$ | 10 |
| C$_9$H$_{19}$–⟨N=N⟩–⟨○⟩– OC$_6$H$_{13}$ | 15 |
| C$_9$H$_{19}$–⟨N=N⟩–⟨○⟩– OC$_9$H$_{19}$ | 45 |

Like the device of Example 1, the device obtained was satisfactory in display characteristics.

EXAMPLE 10

A liquid crystal display device was prepared in the same manner as in Example 1 except that the ferroelectric liquid crystal substance, CS-1014, used in Example 1 was replaced by the mixture listed in Table 2.

TABLE 2

| compound | wt. % |
|---|---|
| $C_7H_{15}$–[pyrazine]–[phenyl]–$OC_7H_{15}$ | 9.8 |
| $C_7H_{15}$–[pyrazine]–[phenyl]–$OC_8H_{17}$ | 4.8 |
| $C_7H_{15}$–[pyrazine]–[phenyl]–$OC_9H_{19}$ | 16.9 |
| $C_8H_{17}$–[pyrazine]–[phenyl]–$OC_8H_{17}$ | 12.9 |
| $C_8H_{17}$–[pyrazine]–[phenyl]–$OC_{10}H_{11}$ | 40.9 |
| $C_9H_{19}$–[pyrazine]–[phenyl]–$OC_6H_{13}$ | 12.7 |
| (2S, 4S) $C_5H_{11}$–[cyclohexyl]–[phenyl]–$OCH_2$–[lactone]–$C_2H_9$ | 2.0 |

Like the device of Example 1, the device obtained exhibited satisfactory display characteristics.

Thus, the present invention provides liquid crystal display devices having a bistable memory effect prevented from impairment due to polarization electric field.

What we claim is:

1. A liquid crystal display device comprising a pair of substrates each having transparent electrodes over the surface thereof and an orientation film over the electrode, and a liquid crystal interposed between the pair of substrates, the liquid crystal being a ferroelectric liquid crystal composition having incorporated therein a conjugated cyano compound or conjugated halogen compound serving as an electron acceptor and being uncomplexed with an electron donor in an amount of 100 to 5000 ppm based on the ferroelectric liquid crystal composition, wherein the conjugated cyano compound is dichlorodicyanoparabenzoquinone (DDQ), tetracyanoquinodimethane (TCNQ), tetracyanoethylene (TCE), tetrafluoroetetracyanoquinodimehtane (TFTCNQ), or tetracyanobenzene (TCNB), and wherein the conjugated halogen compound is dichlorodifluoroquinone, dichloroanthraquinone, tetrachlorodiphenoquineone (TCDQ) or tetrabromodiphenoquinone (TBDQ).

2. A liquid crystal display device as defined in claim 1 wherein the conjugated cyano compound or the conjugated halogen compound is present in an amount of 100 to 500 ppm, based on the ferroelectric liquid crystal composition.

* * * * *